(12) United States Patent
Leung

(10) Patent No.: US 6,446,891 B1
(45) Date of Patent: Sep. 10, 2002

(54) WET AND DRY FOOD GRINDER

(75) Inventor: Andy Leung, Shatin N.T. (HK)

(73) Assignee: Revel Inc., Houston, TX (US)

( * ) Notice: Subject to any disclaimer, the term of this patent is extended or adjusted under 35 U.S.C. 154(b) by 0 days.

(21) Appl. No.: 09/429,883

(22) Filed: Oct. 29, 1999

(51) Int. Cl.[7] ............................................. H47J 43/046
(52) U.S. Cl. .................. 241/169.1; 241/36; 241/199.12
(58) Field of Search ............. 99/510, 511; 241/199.12, 241/282.1, 282.2, 36, 37.5, 169.1

(56) References Cited

U.S. PATENT DOCUMENTS

| | | |
|---|---|---|
| 2,028,595 A | 1/1936 | Flegel |
| 2,923,873 A | 2/1960 | Annis |
| 3,403,022 A | 2/1970 | Mantelet |
| 3,612,414 A | 10/1971 | Nevison |
| 3,612,969 A | 10/1971 | Cockroft |
| 3,892,365 A | 7/1975 | Verdun |
| 4,081,144 A | 3/1978 | Bouillet |
| 4,153,210 A | 5/1979 | Schaeffer |
| 4,194,697 A | 3/1980 | Lembeck |
| 4,335,860 A | 1/1982 | Grandel et al. |
| D365,496 S | 12/1995 | McLinden |
| D370,151 S | 5/1996 | McLinden et al. |

Primary Examiner—Mark Rosenbaum
(74) Attorney, Agent, or Firm—Russell J. Egan

(57) ABSTRACT

An improved wet and dry food grinder having a base assembly and a grinder assembly receivable on the base. The base contains an electric motor with associated electrical circuitry and drive means attached thereto. The grinder assembly has a cylindrical cover and a cylindrical grinder bowl received within the cover. Grinder blades are mounted in the grinder bowl and are driven by the drive means. The motor is actuated by placing the grinder assembly in position on the base and pressing down.

4 Claims, 3 Drawing Sheets

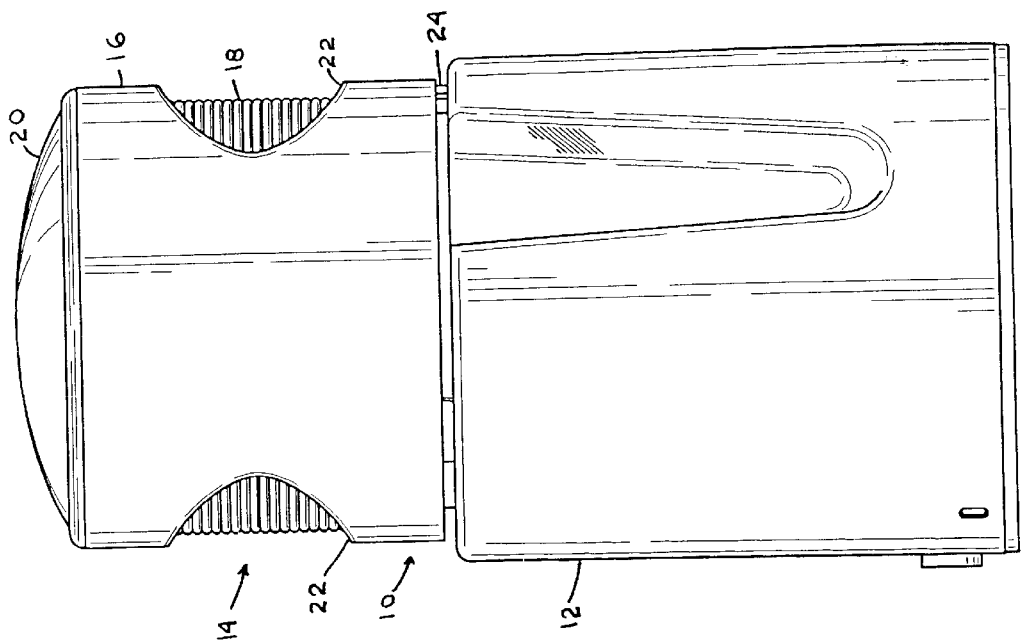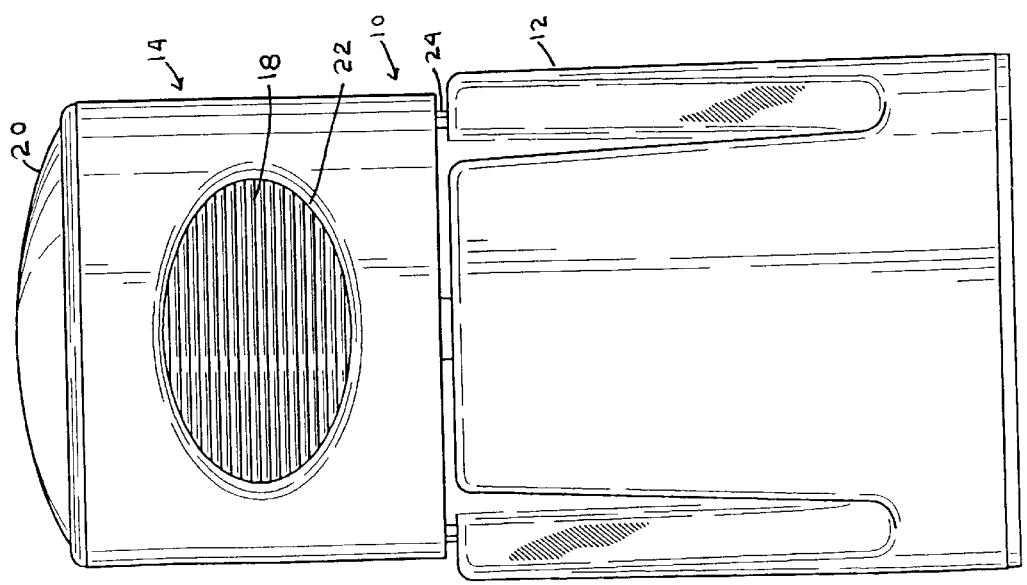

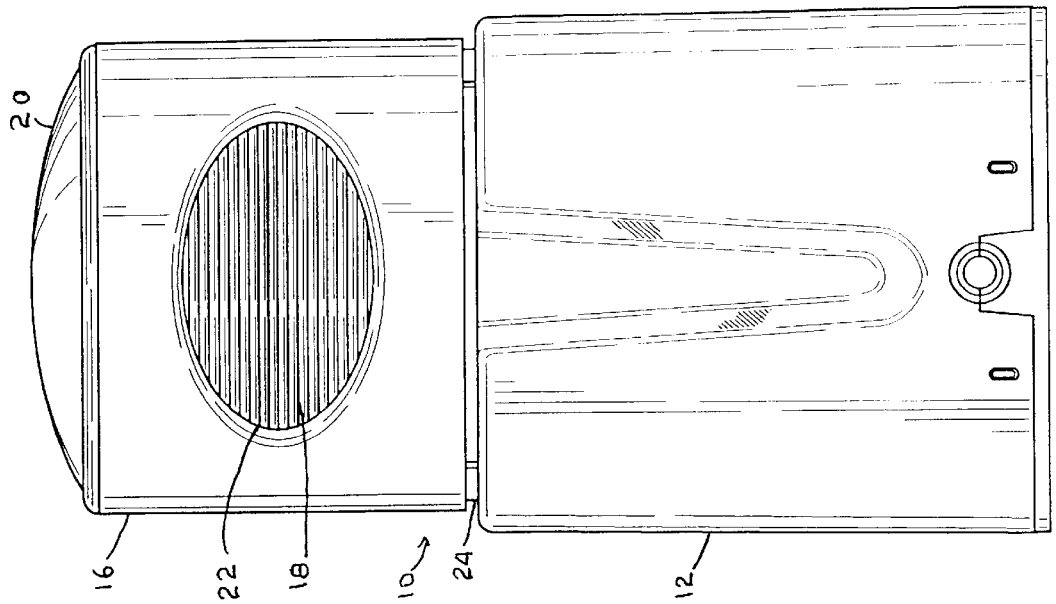
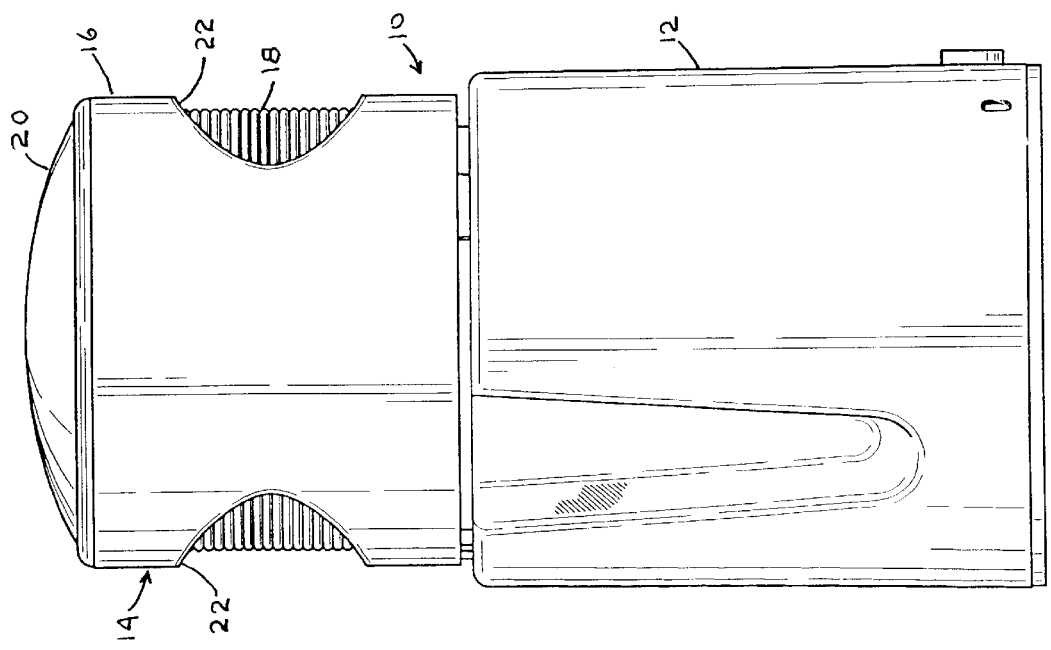

WET AND DRY FOOD GRINDER

BACKGROUND OF THE INVENTION

1. The Field of the Invention

The present invention relates to an improved grinder for grinding both wet (i.e., moisture containing) food stuffs, such as herbs and spices, and dry (i.e., relatively hard food stuffs) such as bread cubes, nuts and beans.

2. The Prior Art

Electric food grinders have been popular kitchen appliances since their introduction to the market in the early 1930's. Initially these devices, commonly called "blenders," were used to puree foods and they could only be used for relatively soft food stuffs, such as fruits and vegetables to make liquids or purees for drinks. Changes and improvements in blade structure have made it possible for these blenders to grind harder foods, such as nuts and beans, but there have always been problems in trying to get a blender that would conveniently grind a wide variety of both wet and dry foods effectively.

U.S. Design Pat. No. 365,496 shows one well-known blender of the type often see in ice cream shops. U.S. Design Pat. No. 370,151 shows another well-known blender of the type often found in the home. U.S. Pat. Nos. 2,923,873 and 3,612,969 both show typical circuitry for multi speed operation of blenders of either or both of the above-mentioned types.

SUMMARY OF THE INVENTION

The present invention is a wet and dry food grinder having a base assembly and a grinder assembly receivable on the base assembly. The base assembly contains a motor with associated electrical circuitry and a drive attached thereto, the drive being exposed at the top of the base assembly. The grinder assembly has a cylindrical cover and a cylindrical grinder bowl received within the cover, grinder blades mounted in the grinder bowl and engagable with the drive to be driven thereby. The cover has depending feet to energize the motor to effect the grinding action. The cove also grippingly engages the grinder bowl and a transparent lid to observe the grinding operation.

BRIEF DESCRIPTION OF THE DRAWINGS

The present invention will now be described, by way of example, with reference to the accompanying drawings, in which:

FIG. 1 is a front elevation of a wet and dry grinder for food preparation according to the present invention;

FIG. 2 is a left side elevation of the subject wet and dry food grinder;

FIG. 3 is right side elevation of the subject wet and dry food grinder;

FIG. 4 is rear elevation of the subject wet and dry food grinder;

DETAILED DESCRIPTION OF AN EMBODIMENT OF THE INVENTION

Figure 6:
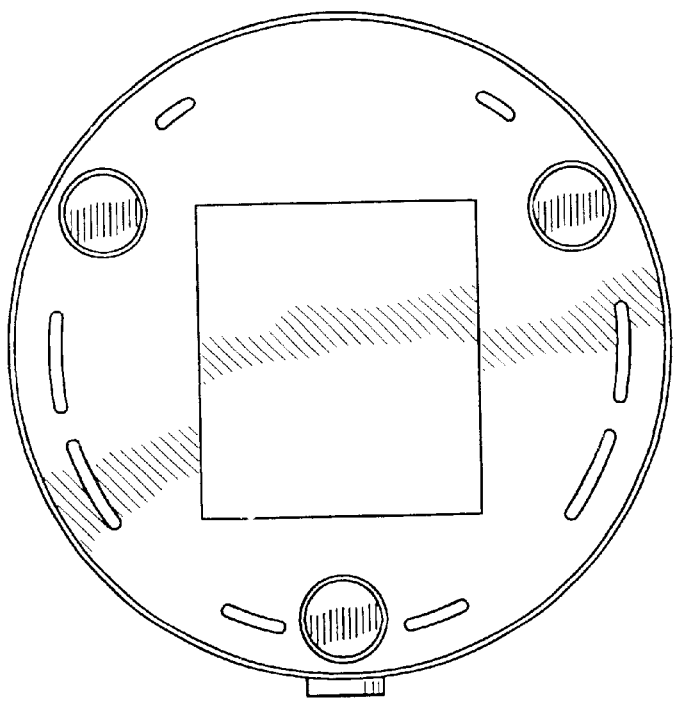
FIG. 6 is a bottom plan view of the subject wet and dry food grinder.
Figure 5:
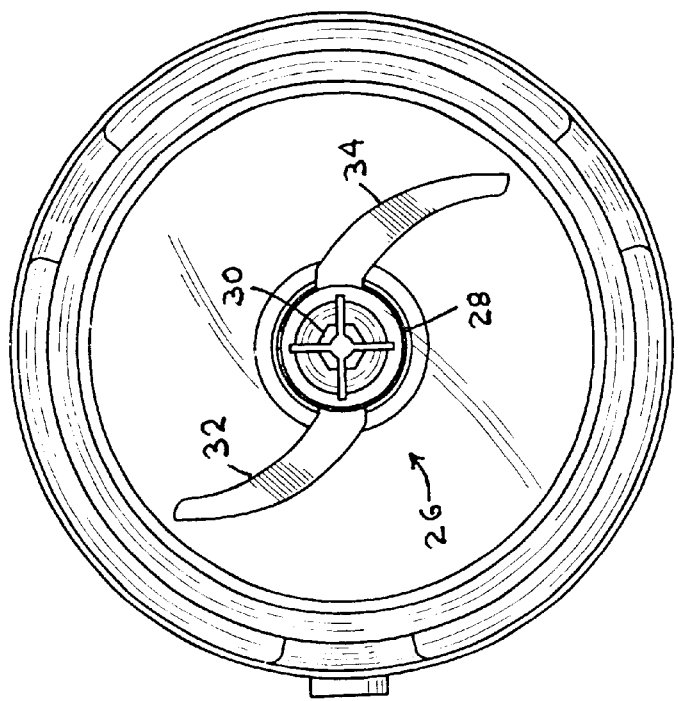
FIG. 5 is top plan view of the subject wet and dry food grinder.

The subject wet dry grinder 10 has a base 12 containing an electric motor and associated circuitry (neither of which has been shown) and a grinder assembly 14. The grinder assembly 14 is formed by an outer cylindrical cover 16 and an inner cylindrical grinder bowl 18. The cylindrical cover 16 has a fixed transparent lid 20, a pair of opposed profiled openings 22, a plurality of depending feet 24 spaced about the periphery thereof and inwardly directed latching means (not shown) engagable with the grinder bowl to secure the two together with a snap fit. The transparent lid 20 enables observation of the food as it is being ground. The cylindrical grinder bowl 18 is easily released from the cylindrical cover 16 by gripping grinder bowl 18 through the profiled openings 22 and pressing downward while the feet 24 are set against a solid object. The cylindrical grinder bowl 18 also contains a blade assembly 26 extending coaxially from the base of the grinder bowl. The blade assembly 26 preferably comprises a hub 28, the lower end of which is profiled to engage and be driven by the drive means on the base 12. The upper end 30 of the hub 28 is profiled to provide a stirring motion to the food that has been ground. A pair of blade members 32, 34 are attached to extend in opposite directions from the hub 28 and with vertical spacing between the blades.

To operate the subject wet and dry grinder, the grinder assembly 14 is removed from the base 13 and opened by separating the cover 16 and the grinder bowl 18. A quantity of food stuffs, such as herbs, spices, bread crumbs, coffee beans, dips, nuts and other delicacies, is then placed in the grinder bowl 18 and the cover 16 snap fitted in place to entirely enclose the food stuff. The grinder assembly 14 is then placed on the base 12 with the drives engaged. The grinder assembly 14 is then depressed so that the feet 24 will penetrate the base housing and actuate pressure switch means (not shown) to energize the motor and grind the food. By observing the food through the transparent lid, the operator is able to determine when sufficient grinding has taken place. The pressure on the grinder assembly 14 is released and the grinder assembly is removed from the base and opened so that the ground food can be dipped or poured out of the grinder bowl.

The present embodiment is for illustrative purposes only. The present invention may be subjected to many modifications and changes without departing from the spirit or essential characteristics as defined by the appended claims.

I claim:

1. An improved wet and dry food grinder comprising:

a base assembly having a housing containing a motor with drive means with associated electrical circuitry attached thereto; and a grinder assembly receivable on said base assembly, said grinder assembly having a cylindrical cover with a transparent lid and a cylindrical grinder bowl received within said cover, grinder means mounted in said grinder bowl, visible through said lid, and engagable with said drive means, and means to energize said motor said cylindrical cover having at least a pair of opposed openings allowing gripping of the grinder bowl to effect relative movement with respect to said cover.

2. An improved wet and dry food grinder according to claim 1 further comprising a grinder assembly mounted coaxially within said grinder bowl, said grinder assembly having a hub and at least a pair of blades mounted on and extending radially from said hub.

3. An improved wet and dry food grinder according to claim 2 wherein the upper free end of said hub is profiled for stirring the ground food.

4. An improved wet and dry food grinder according to claim 2 wherein said blades are vertically spaced along said hub.

* * * * *